(12) United States Patent
Liu et al.

(10) Patent No.: US 11,263,445 B2
(45) Date of Patent: Mar. 1, 2022

(54) METHOD, APPARATUS AND SYSTEM FOR HUMAN BODY TRACKING PROCESSING

(71) Applicant: BAIDU ONLINE NETWORK TECHNOLOGY (BEIJING) CO., LTD., Beijing (CN)

(72) Inventors: Zeyu Liu, Beijing (CN); Le Kang, Sunnyvale, CA (US); Chengyue Zhang, Beijing (CN); Zhizhen Chi, Beijing (CN); Jian Wang, Beijing (CN); Xubin Li, Beijing (CN); Xiao Liu, Beijing (CN); Hao Sun, Beijing (CN); Shilei Wen, Beijing (CN); Errui Ding, Beijing (CN); Hongwu Zhang, Beijing (CN); Mingyu Chen, Beijing (CN); Yingze Bao, Sunnyvale, CA (US)

(73) Assignee: BAIDU ONLINE NETWORK TECHNOLOGY (BEIJING) CO., LTD. (CN)

( * ) Notice: Subject to any disclaimer, the term of this patent is extended or adjusted under 35 U.S.C. 154(b) by 191 days.

(21) Appl. No.: 16/459,868

(22) Filed: Jul. 2, 2019

(65) Prior Publication Data
US 2019/0325209 A1    Oct. 24, 2019

(30) Foreign Application Priority Data
Jul. 4, 2018 (CN) .......................... 201810726681.8

(51) Int. Cl.
*G06K 9/00* (2006.01)
*G06T 7/292* (2017.01)
(Continued)

(52) U.S. Cl.
CPC ..... *G06K 9/00369* (2013.01); *G06K 9/00979* (2013.01); *G06T 7/246* (2017.01);
(Continued)

(58) Field of Classification Search
CPC ........... G06K 9/00369; G06K 9/00979; G06K 9/00335; G06K 9/00771; G06K 9/6262;
(Continued)

(56) References Cited

U.S. PATENT DOCUMENTS 7,106,374 B1 * 9/2006 Bandera ............. H04N 5/23232
348/308
7,693,310 B2 * 4/2010 Kato .................. G06K 9/00261
382/118

(Continued)

FOREIGN PATENT DOCUMENTS

CN         101558996 A      10/2009
CN         102254154 A      11/2011
(Continued)

OTHER PUBLICATIONS

Person Re-identification Using Spatial Covariance Regions of Human Body Parts, Slawomir B ֽak, Etienne Corvee et al., IEEE, 978-0-7695-4264-5, 2010, pp. 435-440 (Year: 2010).*
(Continued)

*Primary Examiner* — Jayesh A Patel
(74) *Attorney, Agent, or Firm* — Dilworth IP, LLC

(57) ABSTRACT

A method, apparatus and a system for human body tracking processing, where an apparatus for video collection processing in the system has a built-in intelligent chip, and before uploading video data to a cloud server, the intelligent chip performs a pre-processing on the video data, retains a key image frame and performs a human body detection and a tracking processing on the key image frame by using human body detection tracking algorithm to acquire a first human body detection tracking result. Afterwards, the intelligent chip sends the first human body detection tracking result to the cloud server, so that the cloud server performs a human body re-identification algorithm processing and/or three-dimensional reconstruction algorithm processing on the first
(Continued)

```
┌─────────────────────────────────────────────────┐
│  Collecting, by the camera, video data          │──── 101
└─────────────────────────────────────────────────┘
                        │
                        ▼
┌─────────────────────────────────────────────────┐
│  Performing, by the intelligent chip, a human   │
│  body detection tracking algorithm processing   │──── 102
│  on the video data collected by the camera to   │
│  acquire a first human body detection tracking  │
│  result                                         │
└─────────────────────────────────────────────────┘
                        │
                        ▼
┌─────────────────────────────────────────────────┐
│  Sending, by the intelligent chip, the first    │
│  human body detection tracking result to a      │
│  cloud server, so that the cloud server         │──── 103
│  processes the first human body detection       │
│  tracking result to acquire a second human      │
│  body tracking result                           │
└─────────────────────────────────────────────────┘
``` human body detection tracking result to acquire a second human body detection tracking result.

5 Claims, 4 Drawing Sheets

(51) Int. Cl.
*G06T 7/246* (2017.01)
*G06K 9/62* (2022.01)
*G06T 17/00* (2006.01)

(52) U.S. Cl.
CPC .......... *G06T 7/292* (2017.01); *G06K 9/00335* (2013.01); *G06K 9/00771* (2013.01); *G06K 9/6262* (2013.01); *G06T 17/00* (2013.01); *G06T 2207/10016* (2013.01); *G06T 2207/30196* (2013.01)

(58) Field of Classification Search
CPC ......... G06T 7/292; G06T 7/246; G06T 17/00; G06T 2207/10016; G06T 2207/30196
See application file for complete search history.

(56) References Cited

U.S. PATENT DOCUMENTS

| | | | | |
|---|---|---|---|---|
| 8,355,083 B2* | 1/2013 | Keiser | .................. | H04N 5/2224 348/559 |
| 8,456,528 B2* | 6/2013 | Brown | ...................... | G06T 7/20 348/169 |
| 9,639,747 B2* | 5/2017 | Zhu | ...................... | G06K 9/6267 |
| 10,599,947 B2* | 3/2020 | Martinello | ................ | G06T 7/20 |
| 2003/0053659 A1* | 3/2003 | Pavlidis | .................... | G06K 9/38 382/103 |
| 2004/0151374 A1* | 8/2004 | Lipton | .................... | G08B 31/00 382/181 |
| 2004/0228503 A1* | 11/2004 | Cutler | ................ | G06K 9/00348 382/103 |
| 2006/0170769 A1* | 8/2006 | Zhou | ................ | G08B 13/19613 348/143 |
| 2012/0243730 A1* | 9/2012 | Outtagarts | ......... | G06K 9/00771 382/103 |
| 2012/0275649 A1* | 11/2012 | Cobb | ............... | G08B 13/19608 382/103 |
| 2013/0335571 A1* | 12/2013 | Libal | .................. | G06K 9/00771 348/150 |
| 2014/0037147 A1* | 2/2014 | Yoshio | ............... | G06K 9/00778 382/107 |
| 2014/0139633 A1* | 5/2014 | Wang | ................. | G06K 9/00778 348/46 |
| 2014/0222501 A1* | 8/2014 | Hirakawa | .......... | G06Q 30/0201 705/7.29 |
| 2014/0341427 A1* | 11/2014 | Kawano | ............. | G06K 9/00771 382/103 |
| 2015/0248586 A1* | 9/2015 | Gaidon | .............. | G06K 9/00711 382/103 |
| 2015/0278585 A1* | 10/2015 | Laksono | .......... | H04N 21/21805 382/103 |
| 2015/0294183 A1* | 10/2015 | Watanabe | ................ | G07C 9/28 382/203 |
| 2016/0125232 A1* | 5/2016 | Zhang | ................ | G06K 9/00288 382/103 |
| 2017/0076576 A1* | 3/2017 | Tan | .................... | G08B 21/0492 |
| 2017/0223311 A1* | 8/2017 | Kim | ................. | H04N 21/42224 |
| 2017/0337726 A1 | 11/2017 | Bui et al. | | |
| 2018/0255329 A1* | 9/2018 | Gonzalez-Banos | ......................... | H04N 21/8456 |
| 2019/0147340 A1* | 5/2019 | Zhang | ................. | G06N 3/0454 706/25 |

FOREIGN PATENT DOCUMENTS

| | | | |
|---|---|---|---|
| CN | 105554354 | A | 5/2016 |
| CN | 105574506 | A | 5/2016 |
| CN | 107222529 | A | 9/2017 |
| CN | 107844775 | A * | 3/2018 |
| CN | 107995495 | A * | 5/2018 |
| CN | 108090403 | A | 5/2018 |

OTHER PUBLICATIONS

Features for Multi-Target Multi-Camera Tracking and Re-Identification, Ergys Ristani et al., arXiv, Mar. 28, 2018, pp. 1-11 (Year: 2018).*
A survey of approaches and trends in person re-identification, Apurva Bedagkar-Gala et al., Elsevier, 0262-8856, 2014, pp. 270-286 (Year: 2014).*
Person Re-identification: Past, Present and Future, Liang Zheng et al., arXiv, Oct. 10, 2016, pp. 1-20 (Year: 2016).*
Person Reidentification via Discrepancy Matrix and Matrix Metric, Zheng Wang et al., IEEE, 2017, pp. 3006-3020 (Year: 2017).*
European Search Report; Application No. EP 19183929.9-1207; dated Oct. 22, 2019; 7 pages.
Second Office Action issued in CN Patent Application No. 201810726681.8 dated Aug. 31, 2020.

* cited by examiner

Receiving, by a cloud server, first human body detection tracking results sent by intelligent chips in at least two apparatuses for video collection processing respectively, where the first human body detection tracking results are obtained by performing a human body detection tracking algorithm processing on video data, and the video data is collected by cameras in the apparatuses for video collection processing to which the intelligent chips belong ⎯ 201

Performing a processing on the first human body detection tracking results to acquire a second human body detection tracking result ⎯ 202

FIG. 2

METHOD, APPARATUS AND SYSTEM FOR HUMAN BODY TRACKING PROCESSING

CROSS-REFERENCE TO RELATED APPLICATION

This application claims priority to Chinese Patent Application No. 201810726681.8, filed on Jul. 4, 2018, which is hereby incorporated by reference in its entirety.

FIELD

The present disclosure relates to the field of human body tracking technologies and, in particular, to a method, an apparatus and a system for human body tracking processing.

BACKGROUND

Human body tracking technology refers to a technology that tracks a human body in videos in real time and acquires a position of the human body at each moment. Human body tracking is a classic research direction in the field of computer vision, and is applied in many scenes such as video surveillance and behave analyzing.

In the current scene of video surveillance, the human body tracking system includes multiple cameras and a cloud server, where the cloud server tracks the target human body in single camera respectively by using methods such as filtering and convolutional neural network; redetect the tracking failure target in the tracking process through human body detection, and corrects the tracking target in each frame image; and re-identifies and verifies the target human bodies in multiple cameras through body identification, thereby implementing human body tracking with multiple cameras.

Most of the human body tracking systems on the current market do not consider positional relationships between these multiple cameras, and it easily generates large errors during content fusion of multiple cameras, causing problems such as target human body identification errors and positioning deviations. At the same time, since ordinary surveillance cameras do not have computing ability, and the video data taken by all these cameras needs to be uploaded into the cloud server for processing, which has higher requirements on network bandwidth, server resources and so on, and is not conducive to rapid expansion, such as increasing the number of the surveillance cameras and supporting larger scenes.

SUMMARY

A method, an apparatus and a system for human body tracking processing provided the embodiments of the present disclosure reduce the requirement of the system for human body tracking on network bandwidth, reduce the dependence on cloud server resources, and improve the overall processing speed of the system.

A first aspect of the present disclosure provides a method for human body tracking processing, where the method is applied to an apparatus for video collection processing which includes a camera and an intelligent chip; and the method includes:
  collecting, by the camera, video data;
  performing, by the intelligent chip, a human body detection tracking algorithm processing on the video data collected by the camera to acquire a first human body detection tracking result; and
  sending, by the intelligent chip, the first human body detection tracking result to a cloud server, so that the cloud server processes the first human body detection tracking result to acquire a second human body tracking result.

Optionally, the performing, by the intelligent chip, a human body detection tracking algorithm processing on the video data collected by the camera to acquire a first human body detection tracking result includes:
  intercepting, by the intelligent chip, video data collected by the camera to acquire a video image frame to be processed;
  extracting a key image frame comprising a human body from the video image frame to be processed; and
  performing a processing on the key image frame by using a human body detection tracking algorithm to acquire the first human body detection tracking result.

Optionally, the processing the key image frame by using a human body detection tracking algorithm to acquire the first human body detection tracking result includes:
  performing a processing on the key image frame by using the human body detection tracking algorithm to acquire a human body foreground image, a two-dimensional position of the human body in the key image frame and a human body identifier; and
  correspondingly, the sending, by the intelligent chip, the first human body detection tracking result to a cloud server, so that the cloud server processes the first human body detection tracking result to acquire a second human body tracking result includes:
  sending, by the intelligent chip, the human body foreground image, the two-dimensional position of the human body in the key image frame and human body identifier to the cloud server, so that the cloud server performs a human body re-identification algorithm processing and/or a three-dimensional reconstruction algorithm processing according to the first human body detection tracking result sent by the intelligent chip in at least two apparatuses for video collection processing to acquire the second human body detection tracking result.

A second aspect of the present disclosure provides a method for human body tracking processing, including:
  receiving, by a cloud server, first human body detection tracking results sent by intelligent chips in at least two apparatuses for video collection processing respectively, where the first human body detection tracking results are obtained by performing a human body detection tracking algorithm processing on video data, wherein the video data is collected by cameras in the apparatuses for video collection processing to which the intelligent chips belong; and
  performing, by the cloud server, a processing on the first human body detection tracking results to acquire a second human body detection tracking results.

Optionally, the first human body detection tracking results comprise a human body foreground image, a two-dimensional position of the human body in a key image frame and a human body identifier;
  correspondingly, the processing, by the cloud server, the first human body detection tracking results to acquire a second human body detection tracking result includes:
  performing a re-identification on the human body foreground images in the first human body detection tracking results by using a human body re-identification algorithm to re-determine human body identifiers of the human bodies, and/or;
  performing, by using a three-dimensional reconstruction algorithm, a three-dimensional reconstruction on the two-dimensional positions of the human bodies in the key image frames in the first human body detection tracking results sent by intelligent chips in at least two apparatuses for video collection processing, where the human bodies are corresponding to a same human body identifier, and determine whether there is a human body identification error, and perform the re-identification on the human bodies when the human body identification error exists.

A third aspect of the present disclosure provides an apparatus for video collection processing, including:

a camera and an intelligent chip that are communicatively connected to each other;

where the camera is configured to collect video data; and the intelligent chip is configured to perform a human body detection tracking algorithm processing on the video data collected by the camera to acquire a first human body detection tracking result; and send the first human body detection tracking result to a cloud server, so that the cloud server processes the first human body detection tracking result to acquire a second human body detection tracking result.

Optionally, the intelligent chip is specifically configured to intercept video data collected by the camera to acquire a video image frame to be processed;

extract a key image frame comprising a human body from the video image frame to be processed; and perform a processing on the key image frame by using a human body detection tracking algorithm to acquire the first human body detection tracking result.

Optionally, the intelligent chip is specifically configured to perform a processing on the key image frame by using the human body detection tracking algorithm to acquire a human body foreground image, a two-dimensional position of the human body in the key image frame and a human body identifier; and send the first human body detection tracking result to the cloud server, so that the cloud server performs a human body re-identification algorithm processing and/or a three-dimensional reconstruction algorithm processing according to the first human body detection tracking result sent by the intelligent chip in at least two apparatuses for video collection processing, so as to acquire the second human body detection tracking result.

A fourth aspect of the present disclosure provides a cloud server, including:

a processor and a memory as well as a communication interface connected to the processor;

the communication interface is connected to an intelligent chip in at least two apparatuses for video collection processing; and the processor receives first human body detection tracking results sent by intelligent chips in at least two apparatuses for video collection processing respectively, and the first human body detection tracking results are obtained by performing a human body detection tracking algorithm processing on video data, wherein the video data is collected by cameras in the apparatuses for video collection processing to which the intelligent chips belong; and the processor performs a processing on the first human body detection tracking results to acquire a second human body detection tracking result; and the memory is configured to store program code required by the processor for processing.

Optionally, the first human body detection tracking results comprise a human body foreground image, a two-dimensional position of the human body in a key image frame and a human body identifier; the processor is specifically configured to perform a re-identification on the human body foreground image in the first human body detection tracking results by using a human body re-identification algorithm to re-determine a human body identifier of the human body, and/or;

the processor performs, by using a three-dimensional reconstruction algorithm, a three-dimensional reconstruction on the two-dimensional position of the human body in the key image frame which is corresponding to the same human body identifier in the first human body detection tracking results sent by intelligent chips in at least two apparatuses for video collection processing, so as to determine whether there is a human body identification error, and perform the re-identification on the human body when the human body identification error exists.

A fifth aspect of the present disclosure provides a system for human body tracking processing, including:

at least two apparatuses for video collection processing and a cloud server, where the apparatuses for video collection processing employ the apparatus according to any one of the third aspect of the present disclosure, and the cloud server employs the server according to any one of the fourth aspect of the present disclosure.

Embodiments of present invention provide a method, an apparatus and a system for human body tracking processing, where an apparatus for video collection processing in the system has a built-in intelligent chip, before uploading video data to a cloud server, the intelligent chip performs a pre-processing on the video data, retains a key image frame and performs a human body detection and a tracking processing on the key image frame by using human body detection tracking algorithm, to acquire a first human body detection tracking result. Afterwards, the intelligent chip sends the first human body detection tracking result to the cloud server, so that the cloud server performs a human body re-identification algorithm processing and/or three-dimensional reconstruction algorithm processing on the first human body detection tracking result to acquire a second human body detection tracking result. It greatly reduces the requirement of the system for human body tracking on network bandwidth, reduces the dependence on cloud server resources and improves the overall processing speed of the system by the pre-processing process of the apparatus for video collection processing. At the same time, the cloud server determines a target human body through the human body re-identification algorithm with the assistance of the three-dimensional reconstruction algorithm, thereby improving the accuracy of a human body identification algorithm.

BRIEF DESCRIPTION OF THE DRAWINGS

The accompanying drawings are incorporated in and constitute part of this specification, illustrating embodiments in accordance with the present disclosure, and together with the description serve to explain the principles of the present disclosure.

FIG. 2 is a flowchart of a method for human body tracking processing according to another embodiment of the present disclosure;

Explicit embodiments of the present disclosure have been shown by the above drawings and will be described in more detail later. The drawings and the text descriptions are not intended to limit the scope of the present disclosure in any way, but to illustrate concept of the present disclosure to those skilled in the art by referring to specific embodiments.

DETAILED DESCRIPTION

Exemplary embodiments will be described in detail herein, and examples thereof are shown in the accompanying drawings. When the following description refers to accompanying drawings, the same numbers in different accompanying drawings represent the same or similar elements unless otherwise indicated. The implementations described in the following exemplary embodiments do not represent all implementations consistent with the present disclosure. Instead, they are merely examples of apparatuses and methods consistent with some aspects of the present disclosure as detailed in the appended claims.

The terms "comprising" and "including", and any variations thereof in the description of the present disclosure, are intended to cover a non-exclusive inclusion. For example, a process, a method, a system, a product, or a device that comprises a series of steps or units is not limited to the listed steps or units, but optionally also includes steps or units not listed, or optionally, also includes other steps or units inherent to the process, method, product or device.

The terms "first" and "second" in the present disclosure are used for identification purposes only, and are not to be construed as indicating or implying a sequential relationship, relative importance, or implicitly indicating the number of technical features indicated. "Multiple" means two or more. "and/or" describes the association relationship of the associated objects and indicates that there may be three relationships, for example, A and/or B, which may indicate that there are three cases where A exists separately, A and B exist at the same time, and B exists separately. The character "/" generally indicates that the contextual object is an "or" relationship.

The phrase "one embodiment" or "an embodiment" as referred throughout the description of the present disclosure means that particular features, structures or characteristics related to embodiments are included in at least one embodiment of the present disclosure. Thus, the "in an embodiment" or "in this embodiment" as used throughout the description does not necessarily refer to the same embodiment. It should be noted that the embodiments of the present disclosure and the features in the embodiments may be combined with each other without conflict.

Figure 1:
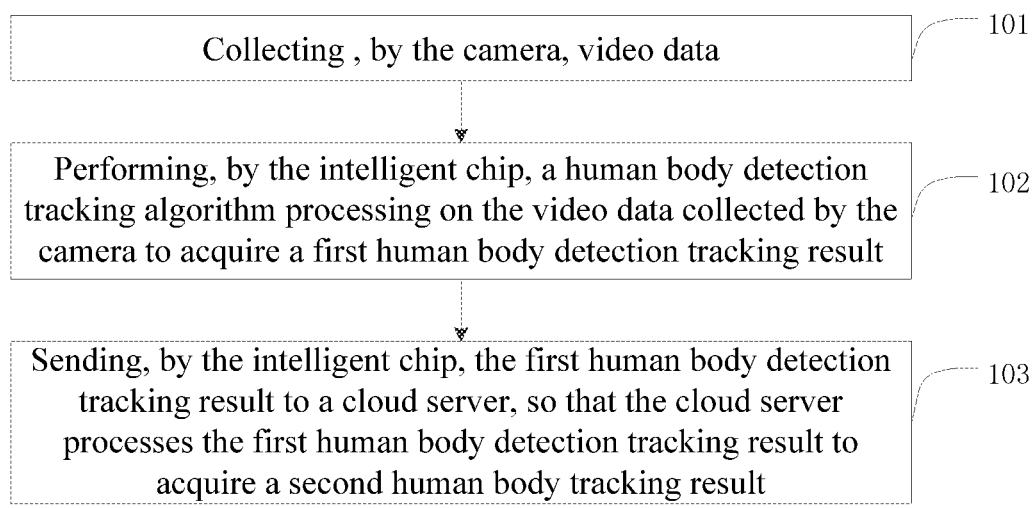
FIG. 1 is a flowchart of a method for human body tracking processing according to an embodiment of the present disclosure.

FIG. 1 is a flowchart of a method for human body tracking processing according to an embodiment of the present disclosure, where an executive entity of the method is an apparatus for video collection processing, as shown in FIG. 1, the method for human body tracking processing provided by the embodiment includes the following steps:

S101: collecting, by the camera, video data.

The apparatus for video collection processing in this embodiment includes a camera and an intelligent chip, where the camera and the intelligent chip are communicatively connected to each other, the camera sends video data collected in some scenes to the intelligent chip in real time, so that the intelligent chip performs a pre-processing on the video data.

S102: performing, by the intelligent chip, a human body detection tracking algorithm processing on the video data collected by the camera to acquire a first human body detection tracking result;

the pre-processing of the video data by the intelligent chip in this embodiment includes extracting a key image frame and human body detection of the key image frame.

Specifically, the intelligent chip intercepts video data collected by the camera to acquire a video image frame to be processed, since the video image frame to be processed has image frames without a human body, the intelligent chip intercepts the video data. When the video image frame to be processed has been obtained, key image frame including human body should be extracted from video image frame to be processed and the image frame without a human body should be removed.

Then the intelligence chip performs human body detection and tracking processing on the key image frame by using a human body detection tracking algorithm, to acquire the first human body detection tracking results. Where the first human body detection tracking results include a human body foreground image, a two-dimensional position of the human body in the key image frame and a human body identifier.

The specific process of the human body detection and tracking processing for key image frame by the intelligent chip is as follows:

extracting features of the key image frame;

determining an area box of the human body features in key image frame;

specifically, the intelligent chip performs detection and tracking processing on the key image frame respectively, fuses the detection results and the tracking results, matches a detection box and a tracking box, performs weighted fusion on the matched detection box and the tracking box, and determines the area box of the human body features in the key image frame; for the detection box that does not be matched, it is considered that there may be a new target body and a new tracker is initialized. For the tracking box that does not be matched, the human body identifier labeled by the intelligent chip may be wrong; and for the detection box that does not be matched, the intelligent chip initializes a new tracking box, and the cloud server labels a new human body identifier.

Determining two-dimensional position of the area box in key image frame;

maintaining human body foreground image corresponding to this area box, and taking the two-dimensional position of the area box in the image frame as the two-dimensional position of human body in the key image frame.

S103: sending, by the intelligent chip, the first human body detection tracking result to a cloud server, so that the cloud server processes the first human body detection tracking result to acquire a second human body tracking result.

The intelligent chip sends the first human body detection tracking results including the human body foreground image, the two-dimensional position of the human body in the key image frame, and the first human body identifier to the cloud server, so that the cloud server performs a body re-identification algorithm processing and/or a three-dimensional reconstruction algorithm processing according to the first human body detection tracking result sent by the intelligent chips in at least two apparatuses for video collection processing, to acquire the second human body detection tracking result.

In the prior art, since ordinary surveillance cameras do not have computing ability, and the video data taken by all these cameras needs to be uploaded into the cloud server for processing, which has higher requirements on network bandwidth, server resources and so on, and is not conducive to rapid expansion (increasing the number of the surveillance cameras, supporting larger scenes, etc.). The apparatus for video collection processing of the embodiment performs a pre-processing on the video data and uploads the processed result to the cloud server, which not only greatly reduces the network bandwidth requirement of the system for human body tracking, but also facilitates system expansion. In addition, since the processing tasks of the human body detection tracking algorithm are shared by the intelligent chip, the dependence on the cloud server resources is greatly reduced, and the overall processing speed of the system is accelerated.

Optionally, the intelligent chip of this embodiment includes NVIDIA TX2 and Inter Movidius.

The method for human body tracking processing is provided by the embodiment of the present disclosure, where the apparatus for the video collection processing has a built-in intelligent chip, before uploading video data to a cloud server, the intelligent chip performs a pre-processing on the video data, retains a key image frame and performs a human body detection and tracking processing on the key image frame by using human body detection tracking algorithm, to acquire a first human body detection tracking result. Afterwards, the intelligent chip sends the first human body detection tracking result to the cloud server, so that the cloud server performs a processing on the first human body detection tracking result to acquire a second human body detection tracking result. It greatly reduces the requirement of the system for human body tracking on network bandwidth, reduces the dependence on cloud server resources and improves the overall processing speed of the system by the pre-processing process of the apparatus for video collection processing.

FIG. 2 is a flowchart of a method for human body tracking processing according to another embodiment of the present disclosure, where an executive entity of the method is a cloud server, as shown in FIG. 2, the method for human body tracking processing provided by this embodiment includes the follow steps:

S201: receiving, by a cloud server, first human body detection tracking results sent by intelligent chips in at least two apparatuses for video collection processing respectively, where first human body detection tracking results are obtained by performing a human body detection tracking algorithm processing on video data, wherein the video data is collected by cameras in the apparatuses for video collection processing to which the intelligent chips belong;

in this embodiment, the cloud server receives contemporaneous first human body detection tracking results sent by the intelligent chip in at least two apparatuses for video collection processing that located in different angles in the same scene. Where the first human body detection tracking result includes a human body foreground image, a two-dimensional position of the human body in a key image frame and a human body identifier.

It should be understood that, the human body foreground images of the same human body in the same scene at the same time captured by different apparatuses for video collection processing are different, and the two-dimensional positions of the human body in the key image frame are different either.

S202: performing a processing on the first human body detection tracking results to acquire a second human body detection tracking result.

After receiving the first human body detection tracking results sent from the intelligent chips in different apparatuses for video collection processing, when the cloud server determines the two-dimensional positions of the human body in the key image frame are instable, that is, when the cloud server determines the human body tracking has occurred some problems, there may be errors in the human body identifier labeled by intelligent chip. At the same time, the cloud server performs a re-identification on the human body foreground image in the first human body detection tracking result by using a human body re-identification algorithm, to re-determine the human body identifier, so as to correct the errors labeled on the human body by the intelligent chip in the apparatus for video collection processing.

Specifically, the cloud server extracts human body features in human body foreground image by using the human body re-identification algorithm, matches the historical human body features stored in the human body database, and takes the human body identifier corresponding to the foreground image with the highest matching degree as the human body identifier of the human body in the current human foreground image. Where, the human database stores the correspondence between historical human body foreground image and human body identifier.

It should be note that, when determining that there is a new target human body in the first detection tracking result sent by the intelligent chip in the video collection processing apparatus, the cloud server labels the new target human body, and stores the new human body identifier and the corresponding human body foreground image into human body database for subsequent human body identification processing. In addition to performing the human body re-identification processing on the first human body detection tracking result, the cloud server further performs a three-dimensional reconstruction processing on the first human body detection tracking results sent by the intelligent chips in at least two apparatus for video collection processing, determines whether the intelligent chip of each apparatus for video collection processing has a human body identification error, and performs the re-identification on the human body when the human body identification error exists.

The process of the three-dimensional reconstruction processing of the cloud server is described in detail below.

The cloud server determines, according to the first human body detection tracking result sent by the intelligent chips in at least two apparatuses for video collection processing, the position coordinates of the target human body corresponding to the same human body identifier in three-dimension space;

the cloud server determines position coordinates of the same human body in three-dimensional space according to the two-dimensional position of target human body in the images corresponding to the same human body identifier collected by at least two cameras at same time, along with the camera matrix of the two cameras. Where the camera matrix is obtained according to the known camera parameters.

Specifically, it is assumed that X1 and X2 are the two-dimensional position coordinates of the same target human body in the image under the two cameras respectively, where P1 is the camera matrix of the camera corresponding to X1, and P2 is the camera matrix of the camera corresponding to X2; then X1, X2 and the position coordinate W of the target human body in the three-dimensional space have the following correspondence:

$$X1=P1*W, X2=P2*W;$$

where * expresses multiplication.

The cloud server calculates the back-projection error of the target human body under the cameras of different apparatuses for video collection processing according to the position coordinates of the target human body in the three-dimensional space corresponding to the same human body identifier; and in this embodiment, the back-projection coordinates of the coordinates in the three-dimensional space in the image acquired by the camera may be calculated according to the coordinates in the three-dimensional space and the camera matrix of the camera. The difference operation between the back-projection coordinate and the two-dimensional position coordinate (obtained according to the existing two-dimensional image coordinate algorithm) is performed to obtain the corresponding back-projection error.

Specifically, it is assumed that the position coordinate W of target human body in three-dimensional space has been obtained, let $Ui=Pi*W$;

let $ei=Ui-Xi$;

where Ui is the back-projection coordinate of W under the i-th camera;

Pi is the camera matrix of the i-th camera;

ei is the back-projection error under the i-th camera;

Xi is the two-dimensional position coordinate of the target body in the corresponding image of the i-th camera; and i is the total number of the cameras set in the scene, and i≥2. The cloud server determines whether the camera has human body identification errors according to the size of the back-projection error of the target human body under the cameras of different apparatuses for video collection processing.

Specifically, when the back-projection error under the camera of an apparatus for video collection processing is greater than a preset threshold, it is determined that the intelligent chip of the apparatus for video collection processing has a human body identification error; and when the back-projection error under the camera of an apparatus for video collection processing is not greater than a preset threshold, it is determined that the human body identification result of the intelligent chip of the apparatus for video collection processing is correct.

This embodiment acquires the second human body detection tracking result after be corrected through the human body re-identification algorithm processing and/or the three-dimensional construction algorithm processing, thereby improving the accuracy of the human body identification algorithm.

In the method for human body tracking processing provided by this embodiment, the human body re-identification algorithm processing and/or the three-dimensional construction algorithm processing are performed on the first human body detection tracking result by receiving first human body detection tracking results sent by intelligent chips in at least two apparatuses for video collection processing respectively, to acquire a second human body detection tracking result, where the first human body detection tracking results are obtained by performing a human body detection tracking algorithm processing on video data, and the video data is collected by cameras in the apparatuses for video collection processing to which the intelligent chips belong. It could greatly improve the accuracy of human body identification algorithm through determining target human body by the human body re-identification algorithm with the assistance of three-dimension reconstruction algorithm.

Figure 3:
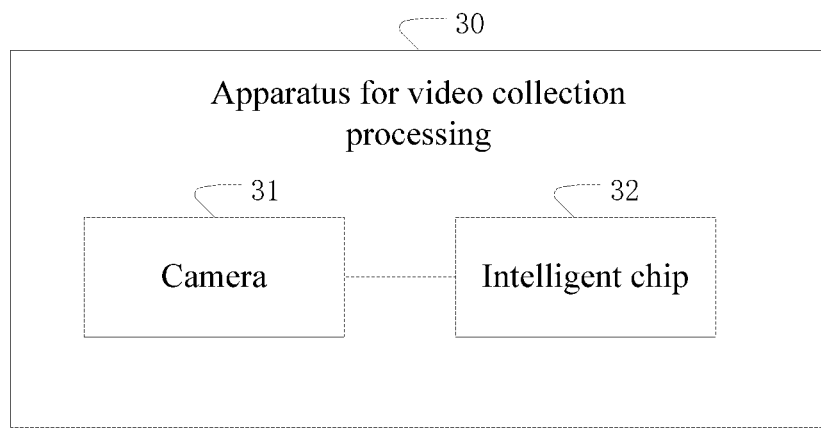
FIG. 3 is a hardware schematic structural diagram of an apparatus for video collection processing according to an embodiment of the present disclosure.

The embodiment of the present disclosure further provides an apparatus for video collection processing, referring to FIG. 3, the embodiment of the present disclosure is merely described by taking FIG. 3 as an example, and the present disclosure is not limited thereto.

FIG. 3 is a hardware schematic structural diagram of an apparatus for video collection processing according to an embodiment of the present disclosure. As shown in FIG. 3, the apparatus for video collection processing 30 provided by this embodiment includes:

a camera 31 and an intelligent chip 32 that are communicatively connected to each other;

the camera 31 is configured to collect video data;

the intelligent chip 32 is configured to perform a human body detection tracking algorithm processing on the video data collected by the camera to acquire a first human body detection tracking result; and send the first human body detection tracking result to a cloud server, so that the cloud server processes the first human body detection tracking result to acquire a second human body detection tracking result.

Optionally, the intelligent chip 32 is specifically configured to intercept video data collected by the camera to acquire a video image frame to be processed;

extract a key image frame comprising a human body from the video image frame to be processed; and perform a processing on the key image frame by using a human body detection tracking algorithm to acquire the first human body detection tracking result.

Optionally, the intelligent chip 32 is specifically configured to perform a processing on the key image frame by using the human body detection tracking algorithm to acquire a human body foreground image, a two-dimensional position of the human body in the key image frame and a human body identifier;

send the first human body detection tracking result to the cloud server, so that the cloud server performs a human body re-identification algorithm processing and/or a three-dimensional reconstruction algorithm processing according to the first human body detection tracking result sent by the intelligent chip in at least two apparatuses for video collection processing, so as to acquire the second human body detection tracking result.

The apparatus according to this embodiment may be used to implement technical solution of method embodiment in FIG. 1. The implementation principle and the technical effect thereof are similar, which will not be described herein again.

Figure 4:
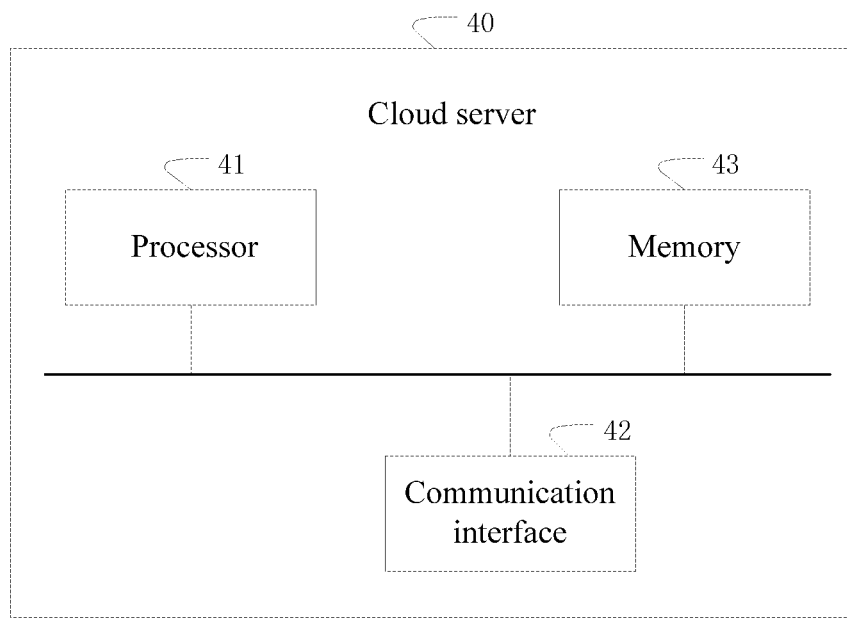
FIG. 4 is a hardware schematic structural diagram of a cloud server according to an embodiment of the present disclosure.

The embodiment of the present disclosure further provides a cloud server, referring to FIG. 4, the embodiment of the present disclosure is merely described by taking FIG. 4 as an example, and the present disclosure is not limited thereto.

FIG. 4 is a hardware schematic structural diagram of a cloud server according to an embodiment of the present disclosure. As shown in FIG. 4, the cloud server 40 provided by this embodiment includes:

a processor 41 and a memory 42 as well as a communication interface 43 connected to the processor 41;

the communication interface 43 is connected to intelligent chips in at least two apparatuses for video collection processing;

the processor 41 receives first human body detection tracking results sent by intelligent chips in at least two apparatuses for video collection processing respectively, and the first human body detection tracking results are obtained by performing a human body detection tracking algorithm processing on video data, wherein the video data is collected by cameras in the apparatuses for video collection processing to which the intelligent chips belong; and the processor performs a processing on the first human body detection tracking results to acquire a second human body detection tracking result; and the memory 42 is configured to store program code required by the processor for processing.

Optionally, the first human body detection tracking results comprise a human body foreground image, a two-dimensional position of the human body in a key image frame and a human body identifier;

the processor 41 is specifically configured to perform a re-identification on the human body foreground image in the first human body detection tracking results by using a human body re-identification algorithm to re-determine a human body identifier of the human body, and/or;

the processor 41 performs, by using a three-dimensional reconstruction algorithm, a three-dimensional reconstruction on the two-dimensional position of the human body in the key image frame which is corresponding to the same human body identifier in the first human body detection tracking results sent by intelligent chips in at least two apparatuses for video collection processing, so as to determine whether there is a human body identification error, and perform the re-identification on the human body when the human body identification error exists.

The cloud server according to this embodiment may be used to implement technical solution of method embodiment in FIG. 2. The implementation principle and the technical effect thereof are similar, which will not be described herein again.

Where the memory 42 and the processor 41 are electrically connected directly or indirectly to implement data transmission or interaction. For example, the components can be electrically connected to one another via one or more communication buses or signal lines, such as via a bus. The memory 42 stores computer programs that can implement the technical solution of the method for human body tracking processing, including at least one software function module that can be stored in the memory 42 in the form of software or firmware, and the processor 41 runs the software programs and module stored in the memory 42 to perform various functional applications and data processing.

The memory 42 may be, but not limited to, a random access memory (RAM), a read only memory (ROM), and a programmable read-only memory (PROM), an erasable programmable read-only memory (EPROM), and an electric erasable programmable read-only memory (EEPROM), etc. Where the memory 42 is used to store programs, and the processor 41 executes the programs after receiving the execution instruction. Further, the software programs and modules within the above memory 42 may also include an operating system, which may include various software components and/or drivers for managing system tasks (e.g., memory management, storage device control, power management, etc.), and it can communicate with various hardware or software components, thereby providing an operating environment for other software components.

The processor 41 can be an integrated circuit chip with signal processing capabilities. The above processor 41 may be a general-purpose processor, including a central processing unit (CPU), a network processor (NP), and the like, which can implement or perform the methods, steps, and logical block diagrams disclosed in the embodiments of the present disclosure. The general-purpose processor may be a microprocessor or the processor may be any conventional processor or the like. It should be understood that the structure of FIG. 4 is merely illustrative and may include more or less components or different configurations than those shown in FIG. 4. Each component shown in FIG. 4 can be implemented in hardware and/or software.

Figure 5:
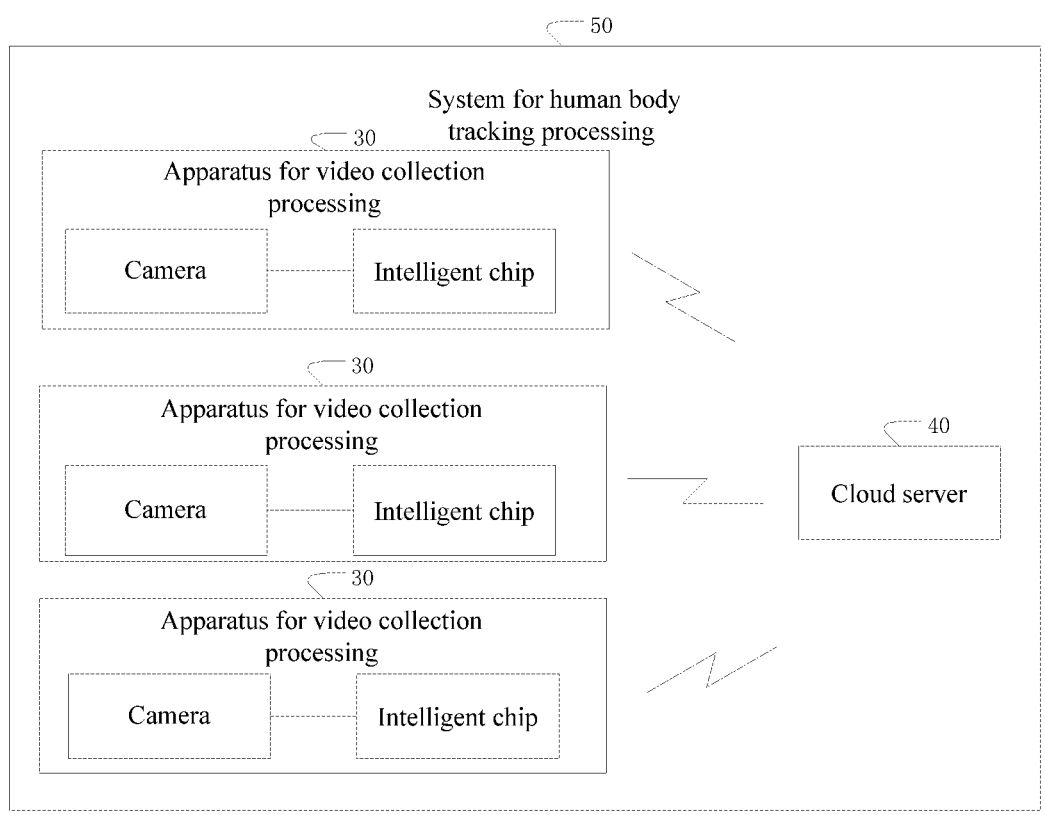
FIG. 5 is a structure schematic diagram of the system for human body tracking processing according to an embodiment of the present disclosure.

The embodiments of the present disclosure further provides a system for human body tracking processing, referring to FIG. 5, the embodiment of the present disclosure is merely described by taking FIG. 5 as an example, and the present disclosure is not limited thereto.

FIG. 5 is a schematic structural diagram of a system for human body tracking processing according to an embodiment of the present disclosure. As shown in FIG. 5, the system for human body tracking processing 50 provided by this embodiment includes:

at least two apparatuses for video collection processing 30 and a cloud server 40, where the apparatus for video collection processing 30 employs the apparatus according to FIG. 3 of the above embodiment, and the cloud server 40 employs the server according to FIG. 4 of the above embodiment. Where at least two apparatuses for video collection processing 30 collect video data from different perspectives in the same scene.

The embodiment of the present disclosure further provides a computer readable storage medium, having a computer program stored thereon, and when the computer program is executed by the processor, it can implement the method for human body tracking processing provided by any one of the above method embodiments.

The computer readable storage medium in this embodiment may be any available medium that can be accessed by a computer, or a data storage device such as a server or a data center that includes one or more available media integrations, and the available medium may be a magnetic medium (e.g., a floppy disk, a hard disk, a magnetic tape), an optical medium (for example, a DVD), or a semiconductor medium (for example, a SSD), etc.

Finally, it should be noted that each of the above embodiments is merely intended for illustrating the technical solutions of embodiments of the present disclosure, rather than limiting them; although the embodiments of the present disclosure are illustrated in detail with reference to the foregoing embodiments, those ordinary skilled in the art should understand that the technical solutions recorded in each of the foregoing embodiments can still be modified, or part or all of the technical features can be substituted equivalently; however, these modifications or substitutions do not make the essence of the corresponding technical solutions depart from the scope of the embodiment solutions of the present disclosure.

What is claimed is:

1. A method for human body tracking processing, wherein the method is applied to an apparatus for video collection processing which comprises a camera and an intelligent chip, and the method comprises:

collecting, by the camera, video data;

performing, by the intelligent chip, a human body detection tracking algorithm processing on the video data collected by the camera to acquire a first human body detection tracking result that comprises a human body foreground image, a two-dimensional position of a human body in a key image frame and a human body identifier; and sending, by the intelligent chip, the first human body detection tracking result to a cloud server whereby the cloud server processes the first human body detection tracking result to acquire a second human body tracking result;

wherein the performing, by the intelligent chip, of the human body detection tracking algorithm processing on the video data collected by the camera to acquire the first human body detection tracking result comprises:

intercepting, by the intelligent chip, the video data collected by the camera to acquire a video image frame to be processed;

extracting the key image frame comprising the human body from the video image frame to be processed; and performing a processing on the key image frame by using the human body detection tracking algorithm to acquire the first human body detection tracking result;

wherein the performing of the processing on the key image frame by using the human body detection tracking algorithm to acquire the first human body detection tracking result comprises:

performing a processing on the key image frame by using the human body detection tracking algorithm to acquire the human body foreground image, the two-dimensional position of the human body in the key image frame and the human body identifier: and correspondingly, the sending, by the intelligent chip, the first human body detection tracking result to the cloud server, so that the cloud server processes the first human body detection tracking result to acquire the second human body tracking result comprises:

sending, by the intelligent chip, the human body foreground image, the two-dimensional position of the human body in the key image frame and the human body identifier to the cloud server, whereby the cloud server performs at least one of a human body re-identification algorithm processing and a three-dimensional reconstruction algorithm processing according to first human body detection tracking results sent by intelligent chips in at least two apparatuses for video collection processing to acquire the second human body detection tracking result.

2. A method for human body tracking processing, comprising:

receiving, by a cloud server, first human body detection tracking results sent by intelligent chips in at least two apparatuses for video collection processing respectively, wherein the first human body detection tracking results comprise human body foreground images, two-dimensional positions of human bodies in key image frames and human body identifiers, the first human body detection tracking results are obtained by performing a human body detection tracking algorithm processing on video data, and the video data is collected by cameras in the at least two apparatuses for video collection processing to which the intelligent chips belong; and performing, by the cloud server, a processing on the first human body detection tracking results to acquire a second human body detection tracking result;

wherein the performing, by the cloud server, of the processing on the first human body detection tracking results to acquire the second human body detection tracking result comprises at least one of the following:

performing a re-identification on the human body foreground images in the first human body detection tracking results by using a human body re-identification algorithm to re-determine human body identifiers of the human bodies; and performing, by using a three-dimensional reconstruction algorithm, a three-dimensional reconstruction on the two-dimensional positions of the human bodies in the key image frames in the first human body detection tracking results sent by the intelligent chips in the at least two apparatuses for video collection processing, wherein the human bodies are corresponding to a same human body identifier, and determine whether there is a human body identification error, and perform the re-identification on the human bodies when the human body identification error exists.

3. An apparatus for video collection processing, comprising:

a camera and an intelligent chip that are communicatively connected to each other;

wherein the camera is configured to collect video data; and the intelligent chip is configured to perform a human body detection tracking algorithm processing on the video data collected by the camera to acquire a first human body detection tracking result that comprises a human body foreground image, a two-dimensional position of a human body in a key image frame and a human body identifier; and send the first human body detection tracking result to a cloud server whereby the cloud server processes the first human body detection tracking result to acquire a second human body detection tracking result;

wherein the intelligent chip is configured to intercept the video data collected by the camera to acquire a video image frame to be processed, extract the key image frame comprising the human body from the video image frame to be processed, and perform a processing on the key image frame by using the human body detection tracking algorithm to acquire the first human body detection tracking result;

wherein the intelligent chip is configured to perform a processing on the key image frame by using the human body detection tracking algorithm to acquire the human body foreground image, the two-dimensional position of the human body in the key image frame and the human body identifier; and send the first human body detection tracking result to the cloud server whereby the cloud server performs at least one of a human body re-identification algorithm processing and a three-dimensional reconstruction algorithm processing according to first human body detection tracking results sent by intelligent chips in at least two apparatuses for video collection processing, so as to acquire the second human body detection tracking result.

4. A cloud server, comprising:

a processor and a memory as well as a communication interface connected to the processor;

the communication interface is connected to intelligent chips in at least two apparatuses for video collection processing;

the processor is configured to perform a method for human body tracking processing, comprising:

receiving, by the cloud server, first human body detection tracking results sent by the intelligent chips in the at least two apparatuses for video collection processing respectively, wherein the first human body detection tracking results comprise human body foreground images, two-dimensional positions of human bodies in key image frames and human body identifiers, the first human body detection tracking results are obtained by performing a human body detection tracking algorithm processing on video data, and the video data is collected by cameras in the at least two apparatuses for video collection processing to which the intelligent chips belong; and performing, by the cloud server, a processing on the first human body detection tracking results to acquire a second human body detection tracking result; and the memory is configured to store program code required by the processor for processing;

wherein the processor is configured to perform at least one of the following:

a re-identification on the human body foreground images in the first human body detection tracking results by using a human body re-identification algorithm to re-determine human body identifiers of the human bodies; and a three-dimensional reconstruction on the two-dimensional positions of the human bodies in the key image frames in the first human body detection tracking results sent by the intelligent chips in the at least two apparatuses for video collection processing by using a three-dimensional reconstruction algorithm, wherein the human bodies are corresponding to a same human body identifier, and determine whether there is a human body identification error, and perform the re-identification on the human bodies when the human body identification error exists.

5. A system for human body tracking processing, comprising:

at least two apparatuses for video collection processing and a cloud server, wherein the at least two apparatus for video collection processing employs an apparatus comprising:

a camera and an intelligent chip that are communicatively connected to each other;

wherein the camera is configured to collect video data; and the intelligent chip is configured to perform a human body detection tracking algorithm processing on the video data collected by the camera to acquire a first human body detection tracking result that comprises a human body foreground image, a two-dimensional position of a human body in a key image frame and a human body identifier; and send the first human body detection tracking result to the cloud server whereby the cloud server processes the first human body detection tracking result to acquire a second human body detection tracking result, wherein the intelligent chip is configured to intercept the video data collected by the camera to acquire a video image frame to be processed, extract the key image frame comprising the human body from the video image frame to be processed, and perform a processing on the key image frame by using the human body detection tracking algorithm to acquire the first human body detection tracking result;

wherein the intelligent chip is configured to perform a processing on the key image frame by using the human body detection tracking algorithm to acquire the human body foreground image, the two-dimensional position of the human body in the key image frame and the human body identifier; and send the first human body detection tracking result to the cloud server whereby the cloud server performs at least one of a human body re-identification algorithm processing and a three-dimensional reconstruction algorithm processing according to first human body detection tracking results sent by intelligent chips in the at least two apparatuses for video collection processing, so as to acquire the second human body detection tracking result; and the cloud server comprising: a processor and a memory as well as a communication interface connected to the processor: the communication interface is connected processing the processor is configured to perform a method for human body tracking processing, comprising: receiving, by the cloud server, the first human body detection tracking results sent by the intelligent chips in the at least two apparatuses for video collection processing respectively, wherein the first human body detection tracking results comprise human body foreground images, two-dimensional positions of human bodies in key image frames and human body identifiers, the first human body detection tracking results are obtained by performing a human body detection tracking algorithm processing on the video data, and the video data is collected by cameras in the at least two apparatuses for video collection processing to which the intelligent chips belong; and performing, by the cloud server, a processing on the first human body detection tracking results to acquire the second human body detection tracking result; and the memory is configured to store program code required by the processor for processing; wherein the processor is configured to perform at least one of the following: a re-identification on the human body foreground images in the first human body detection tracking results by using a human body re identification algorithm to re-determine human body identifiers of the human bodies: and a three-dimensional reconstruction on the two-dimensional positions of the human bodies in the key image frames in the first human body detection tracking results sent by the intelligent chips in the at least two apparatuses for video collection processing by using a three-dimensional reconstruction algorithm, wherein the human bodies are corresponding to a same human body identifier, and determine whether there is a human bbd identification error and perform the re-identification on the human bodies when the human body identification error exists.

* * * * *